United States Patent
Roedl et al.

(10) Patent No.: US 7,278,829 B2
(45) Date of Patent: Oct. 9, 2007

(54) GAS TURBINE BLADE HAVING A MONOCRYSTALLINE AIRFOIL WITH A REPAIR SQUEALER TIP, AND REPAIR METHOD

(75) Inventors: Lawrence Joseph Roedl, West Chester, OH (US); Rabon Hensley, Union, KY (US)

(73) Assignee: General Electric Company, Schenectady, NY (US)

(*) Notice: Subject to any disclaimer, the term of this patent is extended or adjusted under 35 U.S.C. 154(b) by 122 days.

(21) Appl. No.: 11/054,269

(22) Filed: Feb. 9, 2005

(65) Prior Publication Data

US 2006/0174482 A1 Aug. 10, 2006

(51) Int. Cl.
- B21D 53/78 (2006.01)
- B21K 3/04 (2006.01)
- B23K 103/18 (2006.01)
- B23P 15/04 (2006.01)
- F01D 5/28 (2006.01)

(52) U.S. Cl. .............. 416/223; 416/241 R; 29/889.7; 29/889.71; 29/402.09; 29/402.11; 29/402.13; 428/680; 148/428; 228/262.3

(58) Field of Classification Search .......... 228/155, 228/164, 193, 195, 262.3, 262.31; 164/98; 428/680; 148/428; 29/889.7, 889.71, 889.72, 29/402.09, 402.11, 402.13, 402.16; 416/223 R, 416/241 R, 223 A
See application file for complete search history.

(56) References Cited

U.S. PATENT DOCUMENTS

| 4,116,723 | A | 9/1978 | Gell et al. |
| 4,371,404 | A | 2/1983 | Duhl et al. |
| 4,540,339 | A | 9/1985 | Horvath |
| 5,048,183 | A | 9/1991 | Cang et al. |
| 5,395,584 | A | 3/1995 | Berger et al. |
| 5,584,663 | A | 12/1996 | Schell et al. |
| 5,622,638 | A | 4/1997 | Schell et al. |
| 5,712,050 | A | 1/1998 | Goldman et al. |
| 5,822,852 | A | 10/1998 | Bewlay et al. |
| 6,331,361 | B1 | 12/2001 | Esch et al. |
| 6,468,040 | B1* | 10/2002 | Grylls et al. ............... 416/224 |
| 6,558,119 | B2 | 5/2003 | Lee et al. |
| 6,588,103 | B2 | 7/2003 | Fernihough et al. |
| 6,595,749 | B2 | 7/2003 | Lee et al. |
| 2003/0145977 | A1 | 8/2003 | Smashey |
| 2006/0137179 | A1* | 6/2006 | Gorman et al. ............ 29/889.1 |

FOREIGN PATENT DOCUMENTS

| GB | 0869259 A2 | 10/1998 |
| GB | 1217090 A1 | 6/2002 |

\* cited by examiner

Primary Examiner—Michael E. Lavilla
(74) Attorney, Agent, or Firm—McNees Wallace & Nurick LLC

(57) ABSTRACT

A repaired gas turbine blade includes a turbine blade body having a monocrystalline airfoil made of a first nickel-base superalloy, and a repair squealer tip welded to a tip of the airfoil. The repair squealer tip is made of a second nickel-base superalloy different from the first nickel-base superalloy and having less than about 0.15 weight percent total of carbon, boron, silicon, zirconium, and hafnium.

14 Claims, 3 Drawing Sheets

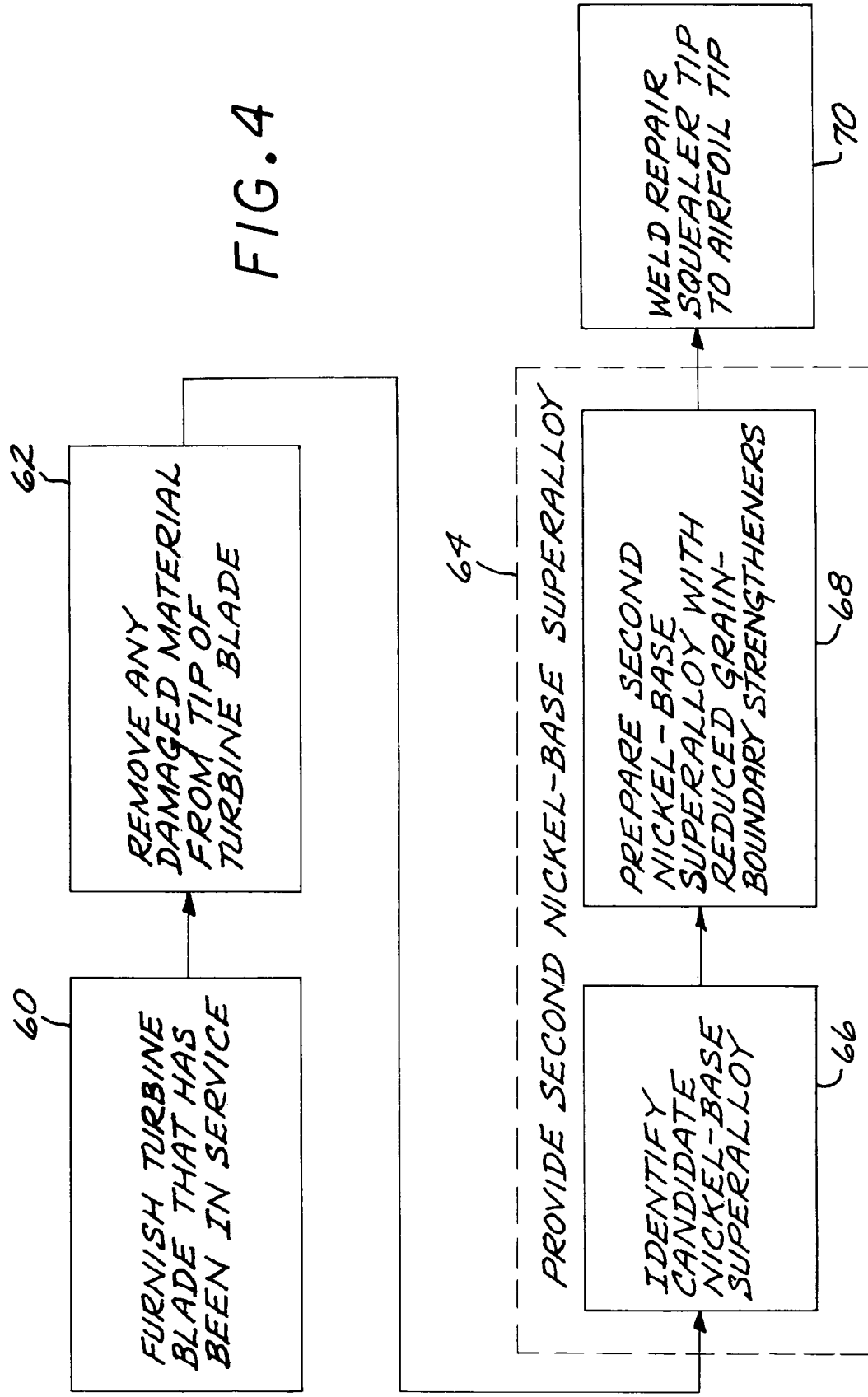

GAS TURBINE BLADE HAVING A MONOCRYSTALLINE AIRFOIL WITH A REPAIR SQUEALER TIP, AND REPAIR METHOD

This invention relates to the repair of the tip of the airfoil of a gas turbine blade and, more particularly, to selection of a nickel-base superalloy for the repair squealer tip.

BACKGROUND OF THE INVENTION

In an aircraft gas turbine (jet) engine, air is drawn into the front of the engine, compressed by a shaft-mounted compressor, and mixed with fuel. The mixture is burned, and the hot combustion gases are passed through a turbine mounted on the same shaft. The flow of combustion gas turns the turbine by impingement against an airfoil section of the turbine blades and vanes, which turns the shaft and provides power to the compressor and fan. In a more complex version of the gas turbine engine, the compressor and a high pressure turbine are mounted on one shaft, and the fan and low pressure turbine are mounted on a separate shaft. The hot exhaust gases flow from the back of the engine, driving it and the aircraft forward.

After a period of time in service, the tip of the turbine blade (called a "squealer tip") is typically eroded, oxidized, and corroded by the impingement of the hot combustion gases. Because the gas turbine blade is expensive to produce, it is preferable to repair the damaged gas turbine blade rather than to discard it, if at all possible. The repair of the gas turbine blade tip is performed by grinding away the damaged material and replacing it with new material to define a repair squealer tip. The replacement is desirably performed by welding the repair squealer tip material to the tip of the airfoil, and then shaping the repair squealer tip material to the desired aerodynamic shape, typically by grinding.

The repair squealer tip material is preferably a nickel-base superalloy. In most cases the repair squealer tip material cannot be the same nickel-base superalloy as the airfoil because most airfoil materials are not readily weldable. Instead, other, more readily weldable superalloys are chosen. However, in certain cases such as where monocrystalline airfoils are being repaired, the selected repair squealer tip materials still are difficult to apply by welding, so that the yield of successful repairs is not as high as is desired.

There remains a need for a repair procedure for monocrystalline nickel-base superalloy gas turbine blade tip, which produces acceptable mechanical performance of the repair squealer tip and also is economic. The present invention fulfills this need, and further provides related advantages.

SUMMARY OF THE INVENTION

The present invention provides a gas turbine blade with a repaired squealer tip, and a method for performing the repair. The nickel-base superalloy used in the repair provides acceptable properties in the repaired gas turbine blade. The composition of the nickel-base superalloy used in the repair is selected to allow the weld repair to be conducted economically with a high yield of satisfactorily repaired turbine blades.

A repaired gas turbine blade comprises a monocrystalline airfoil made of a first nickel-base superalloy, and a repair squealer tip welded to a tip of the airfoil. The repair squealer tip is made of a second nickel-base superalloy different from the first nickel-base superalloy and having less than about 0.15 weight percent total of carbon, boron, silicon, zirconium, and hafnium. More preferably, the total of carbon, boron, silicon, zirconium, and hafnium in the second nickel-base superalloy is less than about 0.10 weight percent, and even more preferably is less than about 0.05 weight percent.

In one preferred form, the second nickel-base superalloy has a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, balance nickel, carbon, boron, silicon, zirconium, hafnium, and impurity elements. In another preferred form, the second nickel-base superalloy has a nominal composition in weight percent of about 14.0 percent chromium, about 9.5 percent cobalt, about 4.0 percent molybdenum, about 4.0 percent tungsten, about 3.0 percent aluminum, about 5.0 percent titanium, balance nickel, carbon, boron, silicon, zirconium, hafnium, and impurity elements. In yet another preferred form, the second nickel-base superalloy has a nominal composition in weight percent of from about 7.4 to about 7.8 percent chromium, from about 5.3 to about 5.6 percent tantalum, from about 2.9 to about 3.3 percent cobalt, from about 7.6 to about 8.0 percent aluminum, from about from about 3.7 to about 4.0 percent tungsten, from about 1.5 to about 1.8 percent rhenium, balance nickel, carbon, boron, silicon, zirconium, hafnium, and impurity elements. In each case the total of carbon, boron, silicon, zirconium, and hafnium is less than about 0.15 weight percent, more preferably less than about 0.10 weight percent, and most preferably less than about 0.05 weight percent.

The first nickel-base superalloy preferably has a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements, or a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

A method for repairing a gas turbine blade comprises the steps of furnishing a turbine blade that has been in service, wherein the turbine blade has a monocrystalline airfoil with an airfoil tip and is made of a first nickel-base superalloy, and removing damaged material from the tip of the airfoil. A repair squealer tip made of a second nickel-base superalloy is welded to the tip of the airfoil. The second nickel-base superalloy is different from the first nickel-base superalloy and has less than about 0.15 weight percent total of carbon, boron, silicon, zirconium, and hafnium. Other compatible features discussed herein may be used in conjunction with this method.

The present invention also provides a design approach for the second nickel-base superalloy. A method for repairing a gas turbine blade comprises the steps of furnishing a turbine blade that has been in service, wherein the turbine blade has a monocrystalline airfoil with an airfoil tip, and wherein the airfoil is made of a first nickel-base superalloy. Any damaged material is removed from the tip of the airfoil. The method further includes identifying a candidate nickel-base superalloy different from the first nickel-base superalloy, wherein the candidate nickel-base superalloy has more than about 0.15 weight percent total of carbon, boron, silicon, zirconium, and hafnium, and preparing a second nickel-base superalloy having a composition of the candidate nickel-base superalloy, except that the second nickel-base superalloy has less than about 0.15 weight percent total of carbon, boron, silicon, zirconium, and hafnium. A repair squealer tip having the composition of the second nickel-base superalloy is applied to the airfoil tip by welding. Other compatible features discussed herein may be used in conjunction with this method. This method provides for the modification of otherwise-advantageous alloy compositions to be useful as the second nickel-base superalloy.

The reduction in and resulting low content of the grain-boundary strengthening elements carbon, boron, silicon, zirconium, and hafnium in the second nickel-base superalloy has little adverse effect on the properties of the repair squealer tip, because the grain-boundary strengthening imparted by these elements is not required. The squealer tip is not strength limited due to its location at the end of the turbine blade. Consequently, omission of the grain-boundary strengthening elements from the second nickel-base superalloy does not limit the performance of the squealer tip. The use of the nickel-base superalloy composition for the second nickel-base superalloy is desired, however, for its oxidation resistance and other environmental performance. The grain-boundary strengthening elements tend to increase the difficulty in performing weld application of the alloy. The reduced levels of these elements in the second nickel-base superalloy improves its weldability, thereby increasing the production yields of the welded repair squealer tips.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4 is a block flow diagram of an approach for practicing an embodiment of the invention.

DETAILED DESCRIPTION OF THE INVENTION

Figure 1:
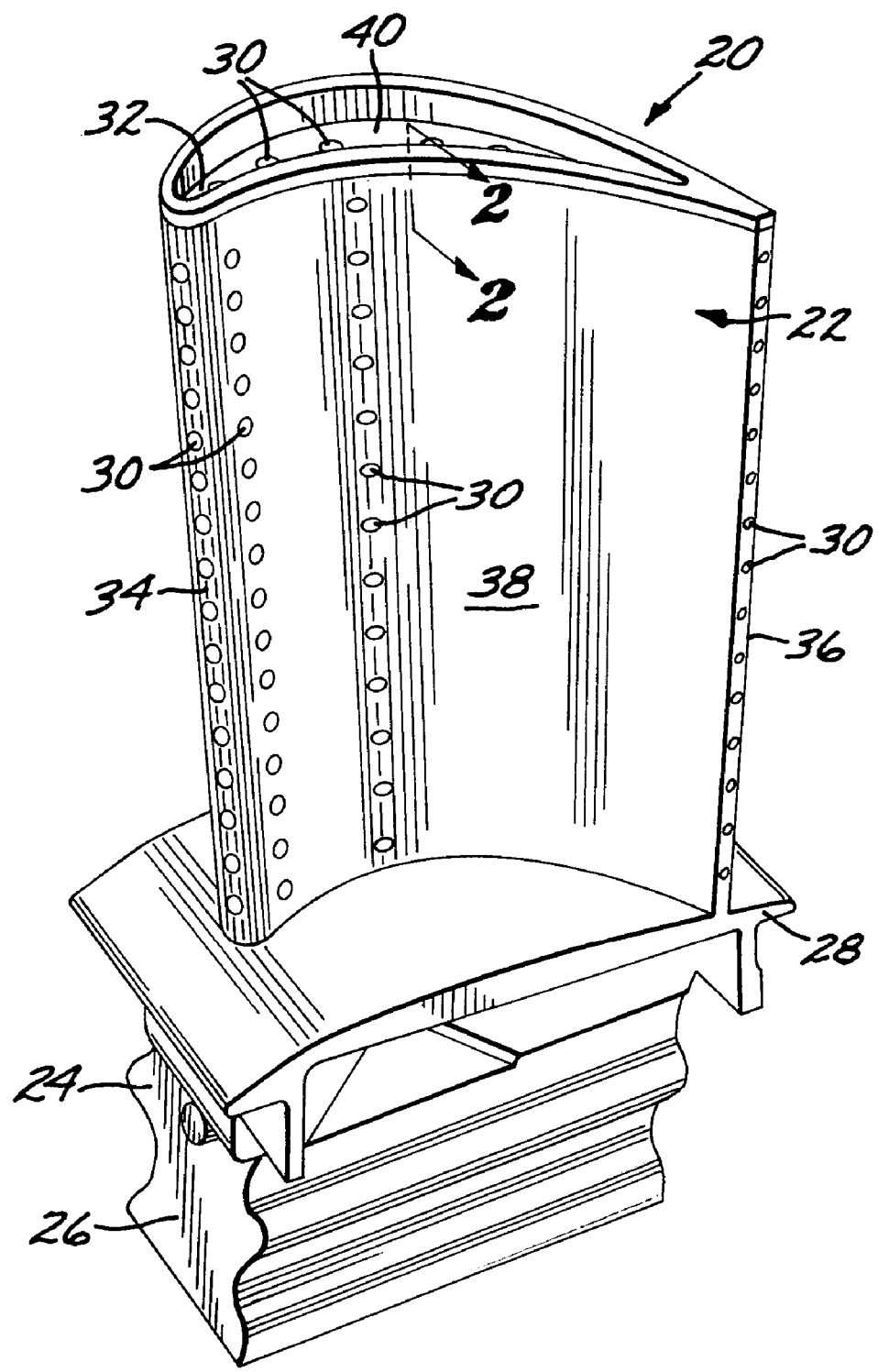
FIG. 1 is a perspective view of a gas turbine blade.

FIG. 1 depicts a gas turbine blade 20 which has preferably previously been in service. The previous service is operation in a gas turbine engine in its normal operating circumstances. The gas turbine blade 20 has an airfoil 22 against which the flow of hot combustion gas impinges during service operation, a downwardly extending shank 24, and an attachment in the form of a dovetail 26 which attaches the gas turbine blade 20 to a gas turbine disk (not shown) of the gas turbine engine. A platform 28 extends transversely outwardly at a location between the airfoil 22, and the shank 24 and dovetail 26. The airfoil 22 may be hollow so that cooling air may be forced through the airfoil 22, with the flow of cooling air exiting the airfoil 22 through air-flow holes 30 found on a tip 32, a leading edge 34, a trailing edge 36, and the lateral sides 38 of the airfoil 22.

In advanced gas turbine engines, the airfoil 22 (and desirably the remainder of the gas turbine blade 22) is monocrystalline. That is, there are substantially no grain boundaries in the monocrystalline portion, and the crystallographic orientation is the same throughout. The term "monocrystalline" means that virtually the entire article, preferably at least 90 percent of its volume, is a single crystal with the same crystal orientation throughout, although there may be some incidental small regions having other crystalline orientations present. Even a substantially monocrystalline article typically has a number of low-angle grain boundaries present, and these are permitted within the scope of the term "monocrystalline". The article may not be a polycrystal, either a random polycrystal or an oriented polycrystal such as produced by directional solidification.

The airfoil 22 (and desirably the remainder of the gas turbine blade 22) is made of a first nickel-base superalloy. As used herein, "nickel-base" means that the composition has more nickel present than any other element. The nickel-base superalloys are typically of a composition that is strengthened by the precipitation of gamma-prime phase or a related phase, typically in an amount of more than 10 volume percent. Examples of operable first nickel-base superalloys include Rene® N5, having a nominal composition in weight percent of 7.5 percent cobalt, 7.0 percent chromium, 1.5 percent molybdenum, 5 percent tungsten, 3 percent rhenium, 6.5 percent tantalum, 6.2 percent aluminum, 0.15 percent hafnium, 0.05 percent carbon, 0.004 percent boron, 0.01 percent yttrium, balance nickel and minor elements, and Rene® N6, having a nominal composition in weight percent of 12.5 percent cobalt, 4.2 percent chromium, 1.4 percent molybdenum, 5.75 percent tungsten, 5.4 percent rhenium, 7.2 percent tantalum, 5.75 percent aluminum, 0.15 percent hafnium, 0.05 percent carbon, 0.004 percent boron, 0.01 percent yttrium, balance nickel and incidental impurities.

Figure 2:
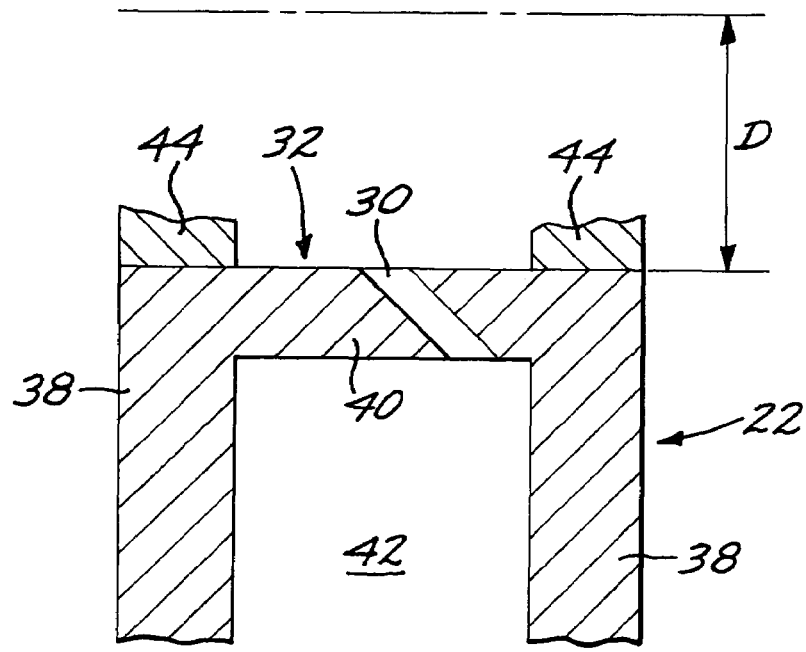
FIG. 2 is a sectional detail of the gas turbine blade of FIG. 1, taken on line 2-2, after service but prior to repair.

FIG. 2 illustrates the region near the tip 32 of the airfoil 22 (which is also the tip of the turbine blade 20) in greater detail. The airfoil 22 includes its lateral sides 38 and a tip cap 40, which together define a hollow volume 42 through which the cooling air passes to exit at the air-flow hole 30.

A squealer tip 44 defines the tip 32 of the airfoil 22. The squealer tip 44 extends radially outwardly relative to the gas turbine disk when the gas turbine blade 20 is mounted to the gas turbine disk. As the gas turbine blade 20 rotates with the gas turbine disk, the squealer tip 44 contacts and rubs against a seal structure on a stationary shroud (not shown) to provide a seal against leakage of hot combustion gas around the gas turbine blades 20. The seal forces the hot combustion gas to flow through the gas turbine as defined by the airfoils 22 of the gas turbine blades, imparting energy to the gas turbine and causing it to turn.

The squealer tip of a new-make gas turbine blade 20 starts out with a length indicated by the dimensional marker D, but is gradually worn, oxidized, corroded, and burned away to a length such as shown for the squealer tip 44 of FIG. 2. This shortening of the squealer tip 44 allows hot combustion gas to leak around the gas turbine, so that the efficiency of the gas turbine is reduced. It is therefore conventional practice during refurbishment of the gas turbine to repair and lengthen the squealer tips of the gas turbine blades 20 back to substantially the same length as indicated by the dimension D. The loss of efficiency of the gas turbine due to damage to the squealer tip is thereby eliminated.

Figure 3:
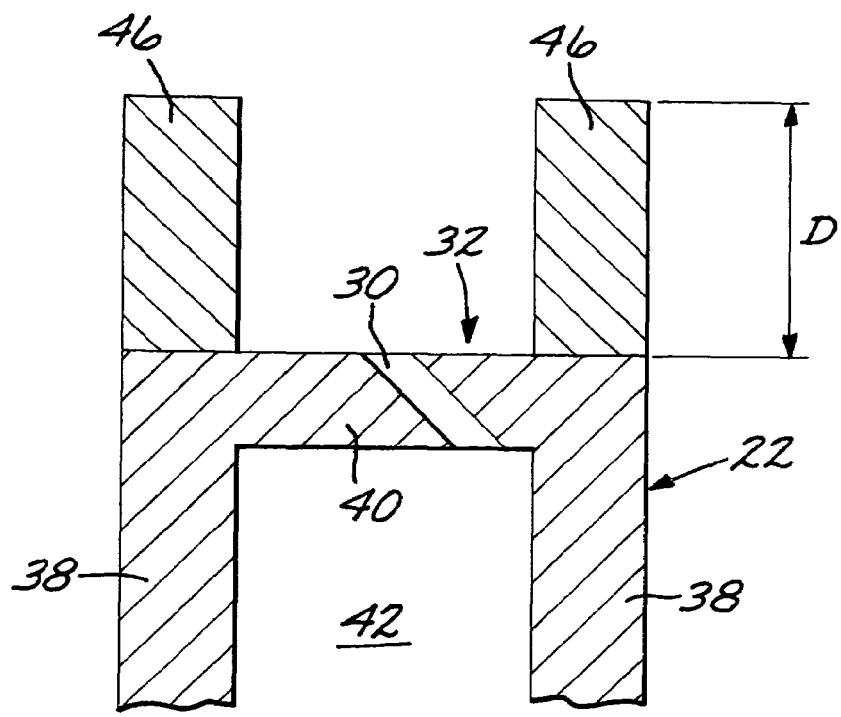
FIG. 3 is a sectional detail of the gas turbine blade of FIG. 1, taken on line 2-2, after service and after repair.

To effect the repair, there is a repair squealer tip 46 welded to the tip 32 of the airfoil 22 to restore the length of the squealer tip to the desired value D, as shown in FIG. 3. The repair squealer tip 46 is made of a second nickel-base superalloy having less than 0.15 weight percent total of carbon, boron, silicon, zirconium, and hafnium. More preferably, the repair squealer tip 46 has less than 0.10 weight percent total of carbon, boron, silicon, zirconium, and hafnium, and most preferably less than 0.05 weight percent. The second nickel-base superalloy preferably has a composition that is different from that of the first nickel-base superalloy, particularly in that it is weldable.

Some examples of operable second nickel-base superalloys include modified Rene® 142 alloy having a nominal composition in weight percent of 12.0 percent cobalt, 6.8 percent chromium, 1.5 percent molybdenum, 4.9 percent tungsten, 2.8 percent rhenium, 6.35 percent tantalum, 0.6.15 percent aluminum, balance nickel, carbon, boron, silicon, zirconium, hafnium, and impurity elements; modified Rene® 80 having a nominal composition in weight percent of 14.0 percent chromium, 9.5 percent cobalt, 4.0 percent molybdenum, 4.0 percent tungsten, 3.0 percent aluminum, 5.0 percent titanium, balance nickel, carbon, boron, silicon, zirconium, hafnium, and impurity elements; and modified Rene® 195 having a nominal composition in weight percent of from 7.4 to 7.8 percent chromium, from 5.3 to 5.6 percent tantalum, from 2.9 to 3.3 percent cobalt, from 7.6 to 8.0 percent aluminum, from 3.7 to 4.0 percent tungsten, from 1.5 to 1.8 percent rhenium, balance nickel, carbon, boron, silicon, zirconium, hafnium, and impurity elements. In each case the total of carbon, boron, silicon, zirconium, and hafnium is less than 0.15 weight percent, more preferably less than 0.10 weight percent, and most preferably less than 0.05 weight percent.

In their un-modified forms, each of these second nickel-base superalloys has a substantially greater total of carbon, boron, silicon, zirconium, and hafnium present as a grain-boundary strengthener, along with other elements to provide good physical properties in the gamma/gamma-prime strengthened superalloy. In the present application as a welded repair squealer tip 46 on a monocrystalline airfoil 22, however, there is no need for grain-boundary strengthening of the second nickel-base superalloy because the squealer tip 46 is not strength limited.

Moreover, the presence of these grain-boundary strengtheners interferes with the application of the repair squealer tip 46 by welding, reducing the yield of good welded product during production welding operations. The omission of the grain-boundary strengthening elements improves weld application of the squealer tip by reducing the amount of slag that forms at the weld. The slag may unintentionally be folded into the weld to cause inclusions and porosity, and its reduction reduces the chances of such defects. Avoiding such inclusions when excess slag is formed requires a high level of skill in the welder, and reducing the excess slag reduces the skill requirement and shortens the welding time. Even external slag must be removed by grinding, thereby increasing the repair costs. Weld sagging is reduced, so that the need for extra weld passes is avoided. The omission of the grain-boundary strengtheners also avoids the need to alter the welding procedures to add more heat to the weld. Weld cracking and segregation problems such as hafnium segregation are also reduced.

Consequently, the total amount of the grain-boundary strengtheners carbon, boron, silicon, zirconium, and hafnium is reduced to the levels indicated above. Some of the grain-boundary strengtheners may be present because it is too difficult to refine them out of the second nickel-base superalloy, but ideally there is as little of these elements present as possible.

FIG. 4 is a block diagram illustrating a preferred embodiment of a method for repairing the gas turbine blade 20. The turbine blade 20 as described earlier, which has been in service, is furnished, step 60. Any damaged material is removed from the airfoil tip 32, step 62. The removing step 60 typically is performed by grinding away damaged material, and usually includes the remaining part of the original squealer tip 44 and any other damage at the tip 32 of the airfoil 22.

The second nickel-base superalloy, with a low content of the grain-boundary strengthening elements carbon, boron, silicon, zirconium, and hafnium as described above, is provided, step 64. This step may be performed by designing an entirely new nickel-base superalloy. More typically, it is performed as illustrated in FIG. 4, by first identifying a candidate second nickel-base superalloy that otherwise meets the requirements for the squealer tip, step 66, and then preparing a modified composition having a reduced total amount of the grain-boundary strengthening elements carbon, boron, silicon, zirconium, and hafnium at an acceptable level, step 68.

The second nickel-base superalloy with the reduced content of grain-boundary strengthening elements is applied by welding to the airfoil tip 32, step 70. The welding is preferably accomplished by a technique such as gas tungsten arc welding, laser welding, or plasma arc welding. In these techniques, the second nickel-base superalloy is melted and allowed to progressively solidify onto the airfoil tip 32 to build up a weldment. After an oversize weldment is built up, the excess material is removed and the weldment is shaped to the required aerodynamic shape, typically by grinding. Alternatively, a preform of the second nickel-base superalloy may be prepared and welded to the airfoil tip 32, but this alternative is less preferred because it is difficult to fully join the preform to the airfoil tip 32 and difficult to achieve the desired microstructure in the final repair squealer tip 46.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A repaired gas turbine blade comprising
a turbine blade having a monocrystalline airfoil made of a first nickel-base superalloy; and
a repair squealer tip welded to a tip of the airfoil, wherein the repair squealer tip is made of a second nickel-base superalloy different from the first nickel-base superalloy and having less than about 0.15 weight percent total of carbon, boron, silicon, zirconium, and hafnium.

2. The repaired gas turbine blade of claim 1, wherein the total of carbon, boron, silicon, zirconium, and hafnium in the second nickel-base superalloy is less than about 0.10 weight percent.

3. The repaired gas turbine blade of claim 1, wherein the total of carbon, boron, silicon, zirconium, and hafnium in the second nickel-base superalloy is less than about 0.05 weight percent.

4. The repaired gas turbine blade of claim 1, wherein the second nickel-base superalloy has a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, balance nickel, carbon, boron, silicon, zirconium, hafnium, and impurity elements.

5. The repaired gas turbine blade of claim 1, wherein the second nickel-base superalloy has a nominal composition in weight percent of about 14.0 percent chromium, about 9.5 percent cobalt, about 4.0 percent molybdenum, about 4.0 percent tungsten, about 3.0 percent aluminum, about 5.0 percent titanium, balance nickel, carbon, boron, silicon, zirconium, hafnium, and impurity elements.

6. The repaired gas turbine blade of claim 1, wherein the second nickel-base superalloy has a nominal composition in weight percent of from about 7.4 to about 7.8 percent chromium, from about 5.3 to about 5.6 percent tantalum, from about 2.9 to about 3.3 percent cobalt, from about 7.6 to about 8.0 percent aluminum, from about from about 3.7 to about 4.0 percent tungsten, from about 1.5 to about 1.8 percent rhenium, balance nickel, carbon, boron, silicon, zirconium, hafnium, and impurity elements.

7. The repaired gas turbine blade of claim 1, wherein the first nickel-base superalloy has a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements or a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

8. A method for repairing a gas turbine blade, comprising the steps of
furnishing a turbine blade that has been in service, wherein the turbine blade has a monocrystalline airfoil with an airfoil tip, and wherein the airfoil is made of a first nickel-base superalloy;
removing damaged material from the airfoil tip;
providing a second nickel-base superalloy different from the first nickel-base superalloy and having less than about 0.15 weight percent total of carbon, boron, silicon, zirconium, and hafnium; and
welding a repair squealer tip to the airfoil tip, wherein the repair squealer tip is made of the second nickel-base superalloy.

9. The method of claim 8, wherein the step of providing includes the step of
providing the second nickel-base superalloy having a total of carbon, boron, silicon, zirconium, and hafnium of less than about 0.10 weight percent.

10. The method of claim 8, wherein the step of providing includes the step of
providing the second nickel-base superalloy having a total of carbon, boron, silicon, zirconium, and hafnium of less than about 0.05 weight percent.

11. The method of claim 8, wherein the step of providing includes the step of
providing the second nickel-base superalloy having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, balance nickel, carbon, boron, silicon, zirconium, hafnium, and impurity elements.

12. The method of claim 8, wherein the step of providing includes the step of
preparing the second nickel-base superalloy having a nominal composition in weight percent of about 14.0 percent chromium, about 9.5 percent cobalt, about 4.0 percent molybdenum, about 4.0 percent tungsten, about 3.0 percent aluminum, about 5.0 percent titanium, balance nickel, carbon, boron, silicon, zirconium, hafnium, and impurity elements.

13. The method of claim 8, wherein the step of providing includes the step of
preparing the second nickel-base superalloy having a nominal composition in weight percent of from about 7.4 to about 7.8 percent chromium, from about 5.3 to about 5.6 percent tantalum, from about 2.9 to about 3.3 percent cobalt, from about 7.6 to about 8.0 percent aluminum, from about from about 3.7 to about 4.0 percent tungsten, from about 1.5 to about 1.8 percent rhenium, balance nickel, carbon, boron, silicon, zirconium, hafnium, and impurity elements.

14. The method of claim 8, wherein the step of furnishing includes the step of
furnishing the first nickel-base superalloy having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements or a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

\* \* \* \* \*